United States Patent [19]

Chown et al.

[11] 4,411,526

[45] Oct. 25, 1983

[54] MEASUREMENT OF ROTATION RATE USING SAGNAC EFFECT

[75] Inventors: Martin Chown, Harlow; Jeffrey G. Farrington, Bishop's Stortford, both of England

[73] Assignee: International Standard Electric Corporation, New York, N.Y.

[21] Appl. No.: 487,997

[22] Filed: Apr. 29, 1983

Related U.S. Application Data

[63] Continuation of Ser. No. 219,557, Dec. 23, 1980, abandoned.

[30] Foreign Application Priority Data

Jan. 17, 1980 [GB] United Kingdom ............... 8001512

[51] Int. Cl.³ .................... G01B 9/02; G01C 19/64
[52] U.S. Cl. .................................................. 356/350
[58] Field of Search ........................................ 356/350

[56] References Cited
U.S. PATENT DOCUMENTS 4,280,766 7/1981 Gross et al. ...................... 356/350

OTHER PUBLICATIONS

"Techniques for Shot Noise Limited Inertial Rotation Measurement Using a Multiturn Fiber Sagnac Interferometer", Davis et al., SPIE vol. 157 Laser Inertial Rotation Sensors (1978) pp. 131–138.

*Primary Examiner*—Vincent P. McGraw
*Attorney, Agent, or Firm*—John T. O'Halloran; Peter R. Ruzek

[57] ABSTRACT

In a Sagnac effect optical fibre gyroscope, which uses a phase nulling photo detection technique to drive a feedback loop controlling one or more non-reciprocal elements connected in series with the coil, a commutating switch reverses the direction of propagation of oppositely directed beams of light directed through the coil and non-reciprocal elements. The null balance is detected as the absence in the photodetector output of any a.c. component in phase or out of phase with the commutation switching. This removes a source of systematic error occasioned by drift in optical parameters of unbalanced components.

2 Claims, 5 Drawing Figures

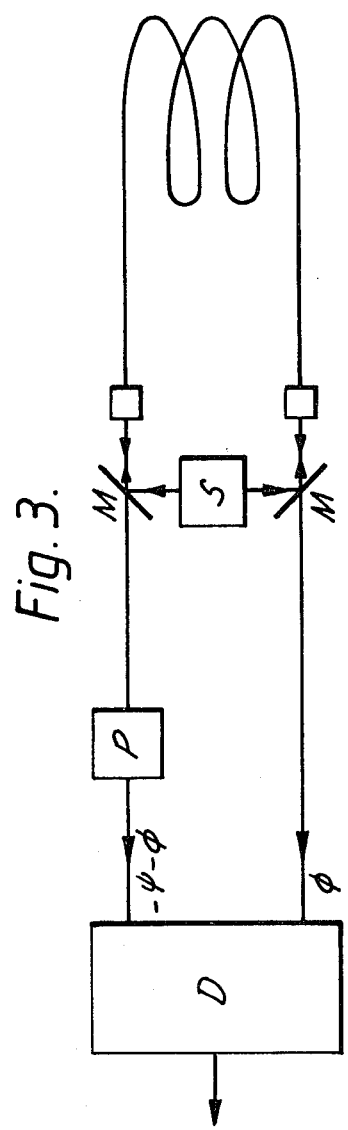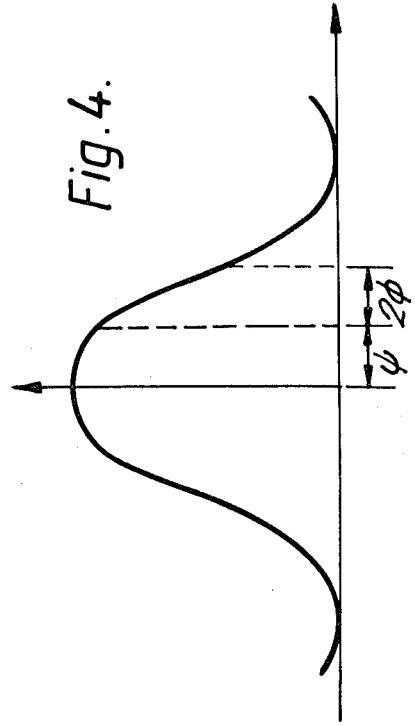

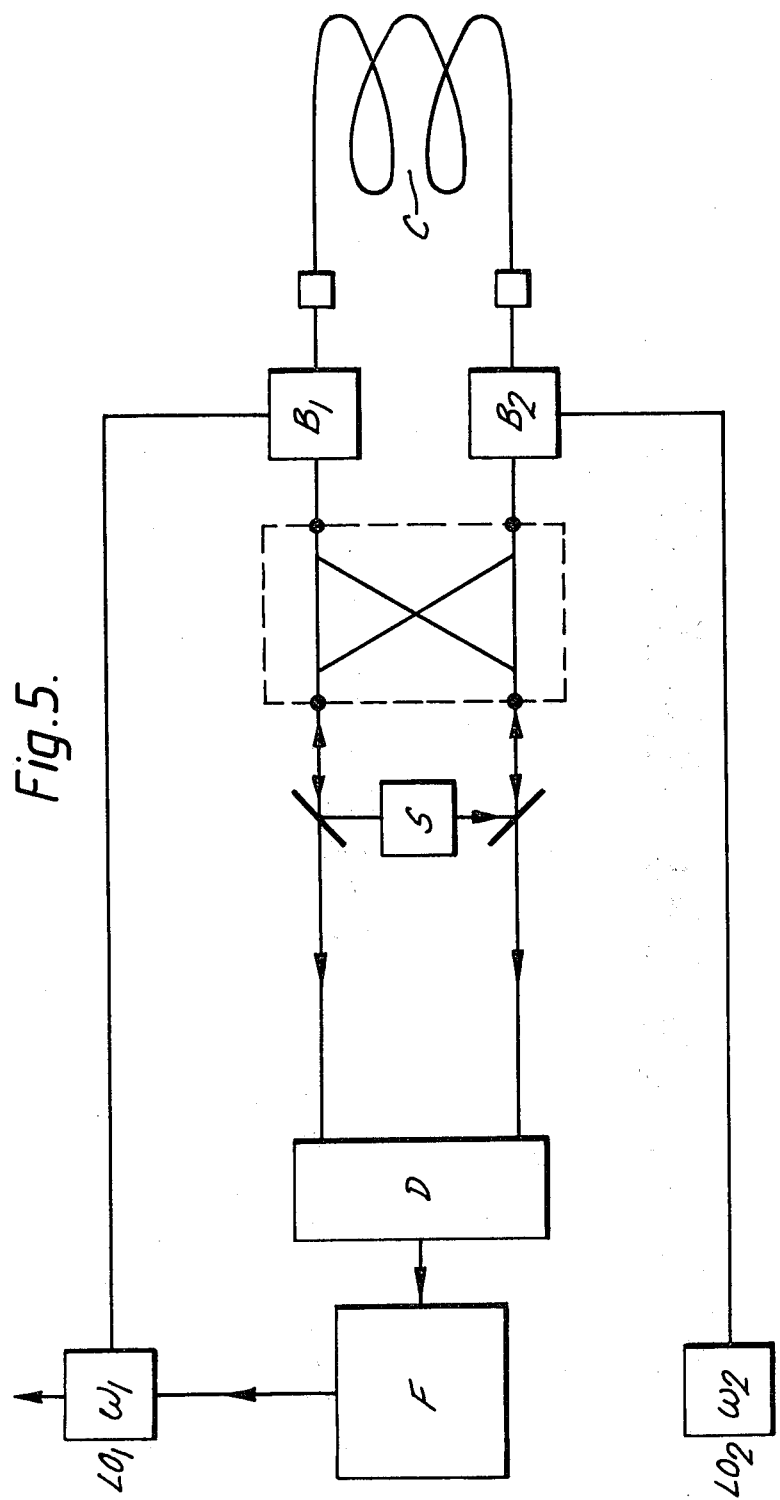

MEASUREMENT OF ROTATION RATE USING SAGNAC EFFECT

This application is a continuation of application Ser. No. 219,557, filed Dec. 23, 1980, now abandoned.

FIELD OF THE INVENTION

This invention relates to the measurement of rate of rotation, and in particular to a Sagnac effect gyro (rotation rate measuring instrument) whose sensing element is provided by an optical fibre coil.

SUMMARY OF THE INVENTION

According to the present invention there is provided an optical fibre coil Sagnac effect rotation rate measuring instrument in which two phase related beams of light are directed through an optical commutating switch, which has a first pair of ports optically connected with a second pair of ports in such a way that operation of the switch interchanges the connection between the members of the first pair of ports and those of the second pair, and are directed from the switch in opposite directions through an optical fibre Sagnac coil, consisting of a plurality of turns of single mode fibre, and through one or more controlable optically nonreciprocal elements to return through the switch, after which the beams are mixed and the interfering beams detected by a photodetector whose output is connected to the input of a feedback control circuit, wherein the paths of the two beams are such that in the absence of any rotation of the coil the two beams are separated by a phase angle substantially different from 0 and from $\pi$, wherein the operation of the switch is controlled by an oscillator operable at a frequency equal to or a multiple of the reciprocal of the propagation time through the Sagnac coil whereby light launched into the coil when the switch is in either one of its two conditions emerges from the coil to return through the switch when once again the switch is in the same condition, and wherein the feedback control circuit is constructed to control the nonreciprocal element or elements in such a way as to minimize any a.c. component of the output of the photodetector in phase or anti phase with the switching of the commutating switch.

BRIEF DESCRIPTION OF THE DRAWINGS

A gyro embodying the invention in a preferred form will now be described, but this description will be prefaced with an explanation of the background to the invention. The description and explanation make reference to the accompanying drawings in which:

FIG. 3 depicts a modified form of the arrangement of FIG. 1

FIG. 4 depicts the output characteristic of the photodetector of the arrangement of FIG. 3, and FIG. 5 depicts an instrument for measuring rotation rate by means of the Sagnac effect.

DESCRIPTION OF THE PREFERRED EMBODIMENTS

The underlying principle of a Sagnac effect gyro (rotation rate measuring instrument) is the utilization of the effect that light propagating in a loop sees an increase in optical path distance around that loop when the loop is rotated in the same sense as the direction of light propagation, and a shortening of optical path distance when the senses are opposite. This loop is conveniently provided by a single mode optical fibre, typically in the region of 10 km long, which is wound into a coil. In the case of such a coil the path difference is given by $$\Delta L = (2\Omega\, RL)/c$$

where $\Omega$ is the angular rotation rate of the coil

L is the length of the fibre c is the speed of light in free space, and

R is the radius of the coil

The optical path distance increment, $\Delta L$, can be measured by reference to the phase of light emerging from the coil. For this purpose light from a source is directed through the coil and interfered at a photodetector with light from the same source directed through a different path. In order to balance out extraneous effects liable to give rise to spurious phase change measurements, it is desirable to make the optical paths of the two interfering beams as similar as possible. For many applications this is conveniently provided by directing the light in both directions through the coil, and interfering the two emergent beams.

Figure 1:
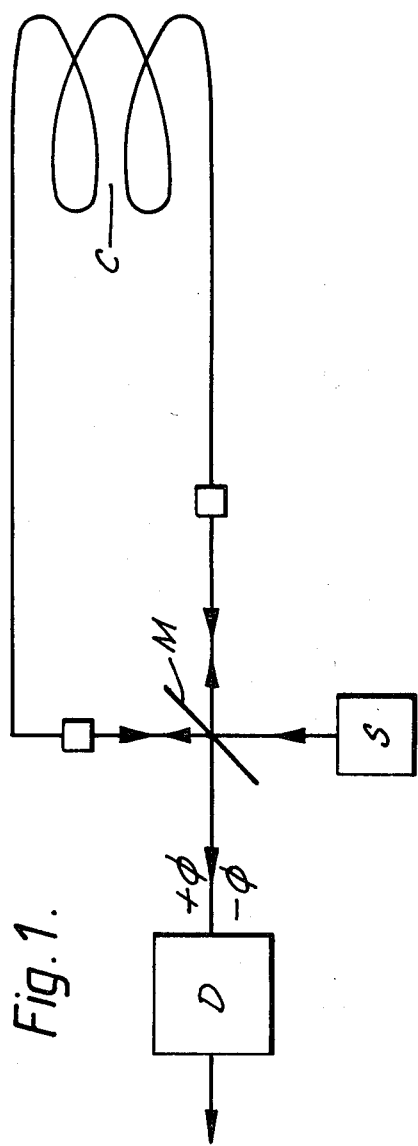
FIG. 1 depicts an arrangement for detecting the Sagnac effect in an optical fibre coil

In principle, the arrangement can be as depicted in FIG. 1 in which light from a laser source S is directed via a beam splitting mirror M to both ends of an optical fibre 'Sagnac' coil C. Light returning from the coil C is recombined by the mirror M to provide an interference signal input to a photodetector D. If the coil is rotating, the phase of one of the recombining beams is advanced by an angle $\Phi$, while that of the other is retarded by the same amount.

Figure 2:
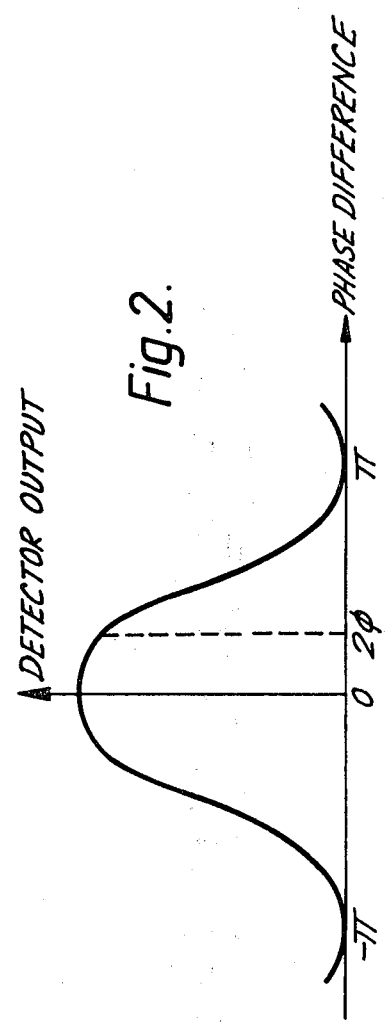
FIG. 2 depicts the output characteristic of the photodetector of the arrangement of FIG. 1

FIG. 2 depicts the detector output characteristic, showing the way the output of the detector D varies with phase angle $\Phi$. This shows that the arrangement of FIG. 1 has too great a symmetry in that the output will not distinguish between the two senses of rotation. Moreover, the arrangement will have very poor sensitivity to small rotation rates because the gradient of the characteristic is extremely small for small values of phase angle $\Phi$.

This problem may be overcome, as shown schematically in FIG. 3, by separating the two optical paths and making them of slightly different length so that when the two beams are recombined to produce an interference signal input to the photodetector D they are separated by a fixed phase angle $\Psi$ in the absence of any rotation of the coil. In FIG. 3 this difference in optical path distance is represented by a lumped element P providing the requisite phase delay $\Psi$. The corresponding detector output characteristic is depicted in FIG. 4. An appropriate choice of magnitude for the fixed phase angle $\Psi$ is one substantially different from 0 and from $\pi$ which will provide a working point on a steep part of the characteristic. This will not only improve sensitivity, but will also distinguish between rotation rates of opposite sense. The penalty for these advantages is that any drift in the fixed phase angle $\Psi$ will result in a direct error in the measurement of $\Phi$. Since $\Psi$ is liable to be many orders of magnitude greater than $\Phi$ this imposes extremely close tolerance requirements upon the optical components that determines the value of $\Psi$. These requirements are relaxed by adopting the commutating arrangement of the present invention.

In the instrument of FIG. 3 rotation of the Sagnac coil is determined by measuring the Sagnac effect induced change in phase difference of the two signals interfering at the detector D. Gyros according to the present invention use an alternative approach of incorporating one or more controllable non-reciprocal elements into the optical circuit which are adjusted by means of a feedback loop to provide an effect exactly cancelling the Sagnac effect. This is a null technique in which the balance condition is detected by monitoring the output of the photodetector and using this output for feedback control. A suitable form of non-reciprocal element for this purpose may be for instance a Faraday cell, or a Bragg elasto-optic frequency shifting cell. In a Bragg cell an electrical signal of frequency $\omega_1$ is applied to the cell to set up a strain pattern of this frequency. This strain pattern is arranged to interact with light of frequency $\omega_0$ propagating through the cell to produce a frequency shifted optical output of frequency $\omega_0 + \omega_1$.

Referring now to FIG. 5, a gyro embodying the invention in a preferred form uses a pair of Bragg cells $B_1$ and $B_2$, as non-reciprocal elements. Light of frequency $\omega_0$ from a laser source is directed by beam splitting mirrors $M_1$ and $M_2$ through a commutating switch SW to the cells $B_1$ and $B_2$. In one condition of the switch, light beams from mirrors $M_1$ and $M_2$ are directed respectively to Bragg cells $B_1$ and $B_2$, while in the opposite condition of the switch the interconnections are interchanged so that they are directed respectively to Bragg cells $B_2$ and $B_1$. The two Bragg cells are driven respectively by local oscillators $LO_1$ and $LO_2$ operating at frequencies $\omega_1$ and $\omega_2$, the former of which is variable while the latter is fixed. The two frequency shifted beams, respectively of frequency $\omega_0 + \omega_1$ and $\omega_0 + \omega_2$, emerging from the Bragg cells are directed into opposite ends of an optical fibre Sagnac coil C. Each emergent beam then returns through the other Bragg cell which provides a further frequency shift to $\omega_0 + \omega_1 + \omega_2$. The two beams returning through the Bragg cells then return through the commutating switch and are directed through the mirrors $M_1$ and $M_2$ and recombined to produce an interference signal input to a photodetector D.

If the coil is not rotated about its axis, and the two local oscillators operate at the same frequency, there is a particular phase angle between the two signals of frequency $\omega_0 + 2\omega_2$ received at the photodetector. This is due to the difference in optical path distance in the unbalanced parts of the two paths from source to detector. If the local oscillator frequencies remain unchanged, and now the coil is rotated about its axis at a constant rate, the phase angle at the photodetector will change because the phase of one of the signals is advanced by the rotation, while that of the other is retarded. This phase relationship is, however, also changed if the frequency of the first local oscillator is changed. This occurs because light is propagating through the coil at one frequency in one direction, but at a different frequency in the opposite direction. The output of the photodetector is, therefore, fed to a feedback control circuit F which provides an output used to control the frequency $\omega_1$ of the first local oscillator so as to maintain a constant phase angle between the beams interfering at the detector D.

Such a feedback control circuit could be made to function without operation of the commutating switch. The instrument would merely require to be set up such that the unbalanced path lengths provide a phase angle separation $\Psi$ at the detector which is substantially different from 0 and from $\pi$ so that the working point on the photodetector output characteristic (which is like that of FIG. 4) is removed from the regions of zero gradient. Such an instrument would, however, have the drawback that any drift in the parameters of the components that determine the value of $\Psi$ would introduce systematic error.

Operation of the commutating switch interchanges the connections so that whenever the Sagnac effect is not exactly compensated by the effect due to the frequency difference between $\omega_1$ and $\omega_2$ an a.c. signal is produced at the output of the photodetector which is either in phase or in antiphase with the switching of the commutating switch. This a.c. signal is, therefore, used to control the feedback control circuit, and in this way small changes in the value of the phase angle $\Psi$ are prevented from introducing systematic error.

In order for this commutation principle to function correctly it is necessary to ensure that light launched into the coil while the switch is in either one of its two conditions must emerge from the coil to return through the switch when once again the switch is in the same condition. This means that the frequency of operation of the switch must be equal to, or a multiple of, the reciprocal of the propagation time through the coil.

We claim:
1. An optical fibre coil Sagnac effect rotation rate measuring instrument, comprising an optical commutating switch including a first, and a second pair of ports, said first ports being optically connected with said second ports in such a way that operation of the switch interchanges the connection between the members of the first pair of ports and those of the second pair, an optical fibre Sagnac coil consisting of a plurality of turns of single mode fibre, two controllable optically non-reciprocal elements, a laser source emitting two phase related beams of light, means for individually directing each of the two phase related beams of light in a separate path towards a different one of said first ports and then through said switch and through the respective non-reciprocal element into the coil for the two beams to travel through the latter in opposite directions and to return through the switch, means for mixing the returning beams, means for detecting the interfering beams including a photodetector having an output, a feedback control circuit having an input connected to the output of the photodetector and an output, the paths of the two beams having such different lengths that in the absence of any rotation of the coil the two beams at the photodetector are separated by a phase angle substantially different from 0 and from $\pi$, and an oscillator controlling the operation of the switch, said oscillator being operable at a frequency equal to or a multiple of the reciprocal of the propagation time through the Sagnac coil whereby light launched into the coil when the switch is in either one of its two conditions emerges from the coil to return through the switch when once again the switch is in the same condition, and the feedback control circuit being constructed to control the non-reciprocal elements in such a way as to minimize any a.c. component of the output of the photodetector in phase or in antiphase with the switching of the commutating switch.

2. An instrument as claimed in claim 1 wherein said non-reciprocal elements include Bragg elasto-optic frequency shifting cells.

* * * * *